(12) United States Patent
Stiesdal

(10) Patent No.: US 8,789,260 B2
(45) Date of Patent: Jul. 29, 2014

(54) METHOD FOR MANUFACTURING A ROTOR FOR A GENERATOR

(75) Inventor: Henrik Stiesdal, Odense C (DK)

(73) Assignee: Siemens Aktiengesellschaft, Munich (DE)

( * ) Notice: Subject to any disclaimer, the term of this patent is extended or adjusted under 35 U.S.C. 154(b) by 389 days.

(21) Appl. No.: 13/084,683

(22) Filed: Apr. 12, 2011

(65) Prior Publication Data

US 2011/0271519 A1    Nov. 10, 2011

(30) Foreign Application Priority Data

May 6, 2010   (EP) ...................... 10162189

(51) Int. Cl.
*H02K 15/02*    (2006.01)
*H02K 15/10*    (2006.01)

(52) U.S. Cl.
USPC ................................. 29/598; 29/428; 29/596

(58) Field of Classification Search
USPC ................ 29/598, 428, 596, 602.1, 732, 890; 148/326, 328, 542, 548
See application file for complete search history.

(56) References Cited

U.S. PATENT DOCUMENTS

| 5,650,024 A * | 7/1997 | Hasegawa et al. ............ 148/326 |
| 5,760,575 A * | 6/1998 | Kumamoto et al. .......... 324/173 |
| 2003/0154600 A1 * | 8/2003 | Umeda et al. .................. 29/890 |

FOREIGN PATENT DOCUMENTS

| DE | 3729868 C1 | 4/1988 |
| FR | 2364074 | 4/1978 |
| GB | 2345308 A | 7/2000 |
| JP | 59125214 A | 7/1984 |
| JP | 10094831 A | 4/1998 |
| JP | 11156432 A | 6/1999 |
| JP | 2006334633 A | 12/2006 |

* cited by examiner

*Primary Examiner* — Thiem Phan

(57) ABSTRACT

A method for manufacturing a rotor for a generator is provided. In accordance with this method, a metal plate is rolled to a circumferentially open circular cylinder having two free ends, the circumferentially open cylinder having an inner diameter smaller than a desired end inner diameter of the rotor. The two free ends of the rolled metal plate are then welded to form a closed cylinder. The closed cylinder is rolled to obtain the desired end diameter of the rotor.

10 Claims, 2 Drawing Sheets

METHOD FOR MANUFACTURING A ROTOR FOR A GENERATOR

CROSS REFERENCE TO RELATED APPLICATIONS

This application claims priority of European Patent Office application No. 10162189.4 EP filed May 6, 2010, which is incorporated by reference herein in its entirety.

FIELD OF INVENTION

The invention relates to a method for manufacturing a rotor for a generator.

BACKGROUND OF INVENTION

The manufacturing process of rotors of generators used in large scale modern wind turbines for instance, in particular direct drive generators for gearless types of wind turbines, comprises in accordance with prior art: rolling a plate of steel with a thickness of approximately 40 mm for instance to a circumferentially open circular cylinder having the desired outer diameter, welding the two adjacent sides of the cylinder so as to form a circumferentially closed cylinder followed by subsequent processing of the cylinder in a special lathe for multiple machining process steps until the desired dimensions of the rotor are achieved under consideration of given tolerances. The inner diameter tolerances may be +/−0.5 mm for an outer rotor type generator having a diameter of about 4 m for instance, which corresponds to permitted deviations of about 0.0125%. These process steps are time consuming and expensive and further take away some of the usability of the generator despite of the other advantages generators of the above described type usually have.

SUMMARY OF INVENTION

Thus, it is an object of the invention to provide an improved manufacturing method of rotors used in generators particularly in regard to time-consumption and cost reduction.

This is achieved by the inventive method for manufacturing a rotor for a generator comprising the steps of:

rolling a metal plate to a circumferentially open circular cylinder with an inner diameter smaller than the desired end inner diameter of the rotor;

welding the two free ends of the rolled metal plate to form a closed cylinder;

rolling the closed cylinder to obtain the desired end diameter of the rotor.

According to the invention, time consuming and therefore costly steps are excluded from the manufacturing process of rotors, as in particular time consuming machining processes of welded cylinders as applied in the above mentioned lathe to obtain the desired dimensions of the rotor are not necessary.

The inventive method differs from prior art already in the initial step as a circumferentially open cylinder is formed by rolling of metal plate having an inner diameter smaller than the desired inner diameter of the rotor. Subsequently, the two free ends of the rolled metal plate, that is the two adjacent sides of the circumferentially open circular cylinder, are welded so as to form a closed cylinder still not having the desired end dimensions of the rotor. The desired end dimensions are achieved by or after the last step of the inventive method comprising another rolling procedure, that is rolling the closed cylinder to obtain the desired end diameter of the rotor.

Since the inventive method particularly does not include any complex, i.e. time-consuming and expensive machining processes as in comparison to the methods known from prior art, no material is removed from the rotor during its manufacturing process, it is considered as a fast and cost-effective manner to produce rotors for generators, particularly large scale generators. Hence, according to the invention a relatively high manufacturing rate of multiple cylinders per hour is achievable compared to the known methods.

As is known, rolling represents a plastic deformation process whereby a work piece or plate of metal is led through a roller mill comprising a number of rotating rolls. Due to the rotation of the rolls the work piece or plate of metal is led through the rolls, thereby being deformed to a circumferentially open circular cylindrical shape. Generally, rolling is a comparatively simple mechanical process, whereby the relative positions of the rolls mainly determine how the work piece or metal plate will deform. Consequently, the relative positions of the rolls define the dimensions of the so obtained diameter of the formed circumferentially open circular cylinder.

Of course, the deformation processes, that is rolling processes may be repeated if necessary so as to obtain or adjust certain mechanical properties of the rolled work piece or metal plate, respectively.

It is preferred to form a closed cylinder having an inner diameter of is 99-99.95%, in particular 99.5-99.95%, of the desired end diameter of the rotor. Thus, the diameter of the closed cylinder is merely slightly different from the desired end dimensions after welding or before the last rolling process, respectively.

Rolling of the metal plate may be performed as cold or hot rolling. Both techniques are well-known and provide different mechanical properties of the rolled work piece. Cold and hot rolling are generally distinguished by the temperature at which rolling is carried out. If the temperature is below the recrystallisation temperature of the material, rolling is termed as cold rolling and accordingly, if rolling is carried out at a temperature above the recrystallisation temperature of the material, rolling is termed as hot rolling.

Cold rolling, which is usually performed at room temperature, increases the strength of the material due to strain hardening. In particular, yield strength and hardness of the rolled material are improved as dislocations or defects are introduced into the crystal lattice of the material. Cold rolling also accounts for a certain surface finish and usually, satisfies tighter tolerances.

In comparison to cold rolling, in hot rolling deformation of the material is performed above its recrystallisation temperature. After the grains deform during processing, re-crystallisation occurs, which maintains an equiaxed microstructure and prevents the metal from work hardening, that is the formation of residual stresses in the material is avoided giving rise to good dimensional stability of hot rolled products. During hot rolling the temperature is regularly monitored to make sure that it remains above the re-crystallisation temperature. Hot rolling allows large deformations achieved by a comparatively low number of rolling cycles.

Hot rolling of the closed cylinder is favourably performed in a manner, so that after hot rolling the diameter of the rotor exceeds the desired end diameter of the rotor, whereby the desired end diameter of the rotor is obtained by subsequent cooling of the hot rolled closed cylinder after hot rolling. Hence, the end dimensions of the rotor are not obtained until cooling of the hot rolled closed cylinder has completely finished. Cooling generally takes place as a directly subsequent process step after hot rolling. Consequently, in particular thermal expansion, that is the coefficient of thermal expansion of the rolled material has to be exactly considered. In other words, the hot rolled material "shrinks", that is contracts, during cooling, i.e. during the decrease in temperature from its temperature during hot rolling to an operational working temperature from an initially larger diameter to the desired end diameter of the rotor.

In a further embodiment of the invention, post-processing of the welded joint is performed to obtain a uniform outer and/or inner surface of the rotor after welding and/or rolling of the closed cylinder. In such a manner possible irregularities originating from the welded joint causing inhomogeneities on the outer and/or inner surface of the rotor may be removed so as to accomplish a homogeneous uniform appearance of the rotor. Only in this case a certain degree of machining of the rotor may be carried out. However, this represents no contradiction to the annotations from above setting forth that the inventive method does not comprise any removal of material, as post-processing of the welded joint does not contribute to the desired end diameter of the rotor, but only to the removal of possible overlaps or excess portions of the welded joint. This step may be performed directly after welding or after rolling of the closed cylinder. It is also possible, that post-processing of the welded joint may be performed in two steps, that is directly after welding as a first step and anew after rolling of the closed cylinder as a second step.

Favourably, a heat treatment is performed after rolling of the closed cylinder. Heat treatments of metals allow a specified adjustment of their mechanical behaviour or properties. Various heat treatments are known for influencing the mechanical behaviour of metals, in particular of iron based metals. Generally, heat treatments involve the use of heating or chilling, usually to extreme temperatures, thereby achieving a desired mechanical behaviour such as hardening or softening of the material for instance. Heat treatment techniques include annealing, case hardening, precipitation hardening, strengthening, tempering and quenching amongst others.

Preferably, annealing or surface hardening is applied as heat treatment. Annealing is a technique used to recover cold work and relax stresses within a metal. Annealing typically results in a soft, ductile material behaviour. During annealing, small grains recrystallise to faun larger grains.

Case hardening is a process in which atoms of an alloying element, most commonly carbon or nitrogen is used, diffuse into the surface of the metal to be hardened. The resulting surface is harder than the base material, thereby improving wear resistance without disregarding toughness.

Preferably, a steel plate is employed as metal plate. It is understood that other metals are applicable as well.

According to another aspect, the invention relates to a rolling apparatus for manufacturing a rotor, comprising several rolls, adapted to perform the aforementioned method. The rolling apparatus is able to receive the metal plate, subsequently moves it through a number of rolls to obtain the circumferentially open circular cylinder and further (that is after welding of the two free ends of the rolled metal plate) is able to roll the closed cylinder to the desired end diameter of the rotor. Generally, the rolling apparatus is capable of performing hot or cold rolling. It is capable of handling different sized metal plates.

It is preferred that the rolling apparatus comprises at least one roll adapted to roll the inside of the closed cylinder, which roll is removable out of the inside of the closed cylinder after rolling has finished. In such a manner it is assured that the closed cylinder is releasable from the rolling apparatus after the inventive method has finished.

In a further embodiment of the invention, the rolling apparatus comprises cooling means for cooling the rolls and/or rolled metal. The cooling means provide a controlled directed cooling process of the rolls or the rolled material, respectively. Cooling means are not only useful when performing hot rolling but also during cold rolling since the material warms up due to the plastic deformation processes.

BRIEF DESCRIPTION OF THE DRAWINGS

In the following, the invention will be described in detail as reference is made to the schematic drawings, wherein.

DETAILED DESCRIPTION OF INVENTION

Figure 1:
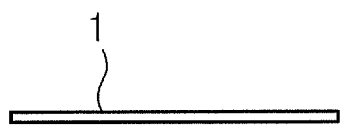
FIG. 1-6 show a principle view of the inventive method according to one embodiment of the invention.
Figure 2:
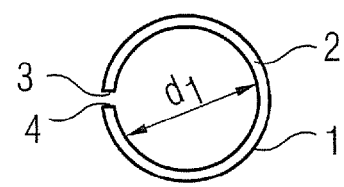
Figure 3:
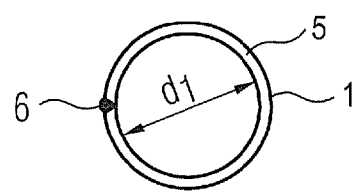
Figure 4:
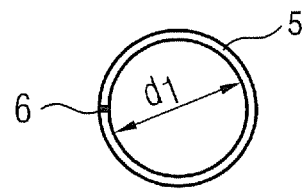
Figure 5:
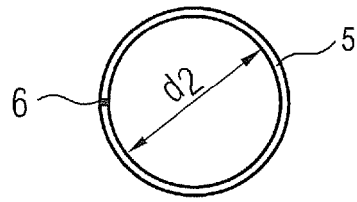
Figure 6:
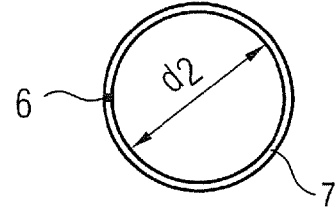

FIGS. 1-6 show principle operations of the inventive method according to one embodiment of the invention. FIG. 1 depicts a metal plate 1, i.e. a steel plate of a rollable steel of given dimensions, that is length, width and thickness. FIG. 2 shows the metal plate 1 after cold rolling to a circumferentially open circular cylinder 2 with two free, abutting or adjacent ends 3, 4 almost touching each other. The inner diameter $d_1$ of the open cylinder 2 is smaller than the desired end diameter $d_2$ of the rotor 7 (cf. FIG. 6). FIG. 3 shows a closed cylinder 5 produced by welding of the two free ends 3, 4 of the open cylinder 2, thereby forming a welding joint 6. FIG. 4 shows the closed cylinder 5 after post-processing of the welding joint 6. In such a manner, the closed cylinder 5 obtains a uniform outer and inner surface, i.e. a homogeneous appearance. Further, it is discernible that the closed cylinder 5 has an inner diameter $d_1$ which is slightly smaller than the desired end diameter $d_2$. The inner diameter $d_1$ of the closed cylinder 5 is about 99.5% of the desired end diameter $d_2$ of the rotor 7. In order to obtain the desired end diameter $d_2$ of the rotor 7 a further step of cold rolling has to be applied. FIG. 5 shows the closed cylinder 5 after this last rolling process, hence, having the desired end diameter $d_2$. FIG. 6 depicts the rotor 7 after a further heat treatment step. In this case an annealing process has been carried out after cold rolling of the closed cylinder 5. Thus, the obtained rotor 7 has a certain mechanical behaviour, i.e. is tough and ductile as residual stresses have been relieved.

It is understood, that a rolling process may comprise several rolling operations. As is discernible, the inventive method does not involve any time-consuming machining processes.

Figure 7:
FIG. 7-12 show a principle view of the inventive method according to another embodiment of the invention.
Figure 8:
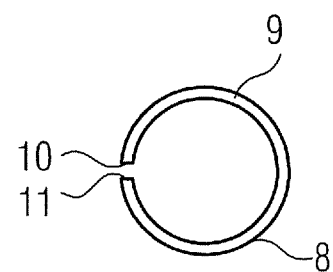
Figure 9:
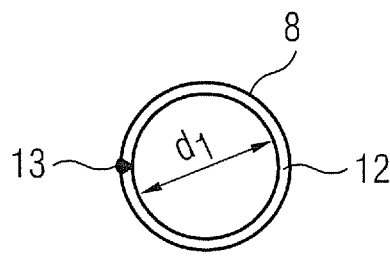
Figure 10:
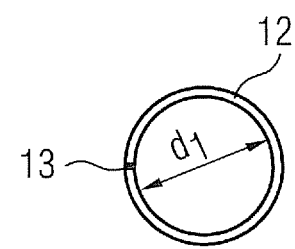
Figure 11:
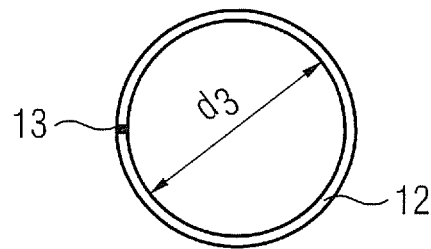
Figure 12:
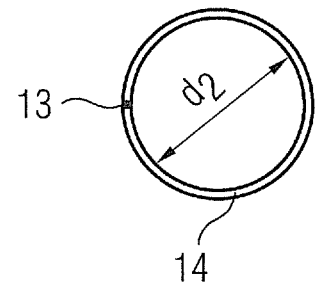

FIGS. 7-12 show principle operations of the inventive method according to another embodiment of the invention. FIGS. 7-10 are essentially the same as FIGS. 1-4. In FIG. 7 a metal plate 8 of known dimensions is provided. FIG. 8 shows the metal plate 8 after cold rolling, thereby faulting a circumferentially open cylinder 9 with two free adjacent ends 10, 11. A closed cylinder 12 is formed after welding of the two free ends 10, 11 as discernible from FIG. 9. Thereby, a welding joint 13 is formed. Post-processing of the welding joint 13 has been performed in FIG. 10 giving rise to a uniform appearance of the closed cylinder 12. After these steps have been accomplished, the closed cylinder 12 has an inner diameter $d_1$ which is slightly smaller than the desired end diameter $d_2$ of the rotor 14 (cf. FIG. 12). The inner diameter $d_1$ of the closed cylinder 12 is approximately 99.5% of the desired end diameter $d_2$ of the rotor 14. FIG. 11 depicts the closed cylinder 12 instantaneously after a hot rolling procedure has been performed, that is the material is still heated above its recrystallisation temperature. Due to thermal expansion the closed cylinder 12 has an inner diameter $d_3$ which is slightly greater than the desired end diameter $d_2$ of the rotor 14, i.e. exceeds the end diameter $d_2$. In this embodiment, the end diameter $d_2$ of the rotor 14 is obtained through a controlled cooling process of the closed cylinder 12 after hot rolling giving rise to contraction of the material. FIG. 12 depicts the rotor 14 after cooling has completely finished, hence, having the desired end diameter $d_2$. Again, no machining is performed during the manufacturing of the rotor 14.

All rolling processes are performed by the above mentioned rolling apparatus for manufacturing a rotor, comprising several rolls. At least one roll is adapted to roll the inside of the closed cylinder, which roll is removable out of the inside of the closed cylinder after rolling has finished in order to release the rolled cylinder. Cooling means are provided for cooling the rolls and/or the rolled metal.

The invention claimed is:

1. A method for manufacturing a rotor for a generator comprising:
   rolling a metal plate to a circumferentially open circular cylinder comprising two free ends, the circumferentially open cylinder having an inner diameter smaller than a desired end inner diameter of the rotor;
   welding the two free ends of the rolled metal plate to form a closed cylinder;
   hot rolling the closed cylinder to a diameter that exceeds the desired end diameter; and
   controlled cooling of the closed cylinder responsive to a coefficient of thermal expansion of the closed cylinder to obtain the desired end diameter of the rotor, utilizing an apparatus comprising:
   a plurality rolls adapted for rolling a metal plate to a circumferentially open circular cylinder comprising two free ends, the circumferentially open cylinder having an inner diameter smaller than a desired end inner diameter of the rotor, and
   a welding device for welding the two free ends of the rolled metal plate to form a closed cylinder;
   a heating device for hot rolling the closed cylinder to a diameter that exceeds the desired end inner diameter of the rotor; and
   a cooling device for controlled cooling of the closed cylinder responsive to a coefficient of thermal expansion of the closed cylinder to obtain the desired end diameter of the rotor.

2. The method according to claim 1, wherein the closed cylinder formed by the step of welding has an inner diameter which is 99-99.95% of the desired end diameter of the rotor.

3. The method according to claim 2, wherein the closed cylinder formed by the step of welding has an inner diameter which is 99.5-99.95%, of the desired end diameter of the rotor.

4. The method according to claim 1, wherein rolling of the metal plate is performed as cold or hot rolling.

5. The method according to claim 1, further comprising performing a post-processing of the welded joint to obtain a uniform outer surface, or a uniform inner surface, or both.

6. The method according to claim 5, wherein the post processing is performed after the step of welding, or after the step of rolling of the closed cylinder, or after both steps.

7. The method according to claim 1, further comprising performing a heat treatment after rolling of the closed cylinder.

8. The method according to claim 7, wherein annealing or surface hardening is applied as heat treatment.

9. The method according to claim 1, wherein a steel plate is employed as metal plate.

10. The method according to claim 1, wherein at least one roll is adapted to roll the inside of the closed cylinder, which at least one roll is removable out of the inside of the closed cylinder after rolling has finished.

* * * * *